(12) United States Patent
Grohs et al.

(10) Patent No.: US 8,966,256 B2
(45) Date of Patent: Feb. 24, 2015

(54) TRANSMITTING A DOCUMENT

(75) Inventors: Randall Edward Grohs, Star, ID (US); Brian E. Hoffmann, Boise, ID (US); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 16 days.

(21) Appl. No.: 13/460,334

(22) Filed: Apr. 30, 2012

(65) Prior Publication Data

US 2013/0290715 A1 Oct. 31, 2013

(51) Int. Cl.
*H04L 29/00* (2006.01)
(52) U.S. Cl.
USPC .............................. 713/168; 705/64
(58) Field of Classification Search
USPC .............................. 705/64; 713/168
See application file for complete search history.

(56) References Cited

U.S. PATENT DOCUMENTS

| | | | |
|---|---|---|---|
| 6,385,655 B1 | 5/2002 | Smith et al. | |
| 2003/0014368 A1* | 1/2003 | Leurig et al. | 705/64 |
| 2008/0005024 A1 | 1/2008 | Kirkwood | |
| 2010/0074442 A1* | 3/2010 | Ohara | 380/243 |
| 2010/0161963 A1 | 6/2010 | Ginter et al. | |

OTHER PUBLICATIONS

Chapter 25, Print Authentication, (Web Page), http://www.papercut.com/products/ng/rnanual/ch-auth-print.html, 2007.
Imagehawk Secure CourierTM Document Delivery Services, (Web Page), http://www.imagehawk.com/services/secure-courier/, 2011.
Hewlett-Packard Development Company, L.P., "HP Access Control Secure Pull Printing," Nov. 2008 <http://h710283.www7.hp.com/enterprise/downloads/HP-Access-Control-Secure-Pull-Printing.pdf>.
ImageHawk, Inc., "ImageHawk Secure CourierTM Document Delivery Services," (Web Page), Nov. 15, 2011, <http://web.archive.org/web/20111115184242/http://www.imagehawk.com/services/secure-courier/>.
PaperCut Software International Pty Ltd., "Print Authentication," Manual, Chapter 25, available Feb. 13, 2012, <http://www.papercut.com/products/ng/manual/ch-auth-print.html>.
Simske et al., "High-Resolution Glyph-Inspection Based Security System," Mar. 21, 2010, <http://www.hpl.hp.com/techreports/2010/HPL-2010-42.pdf>.
Wikipedia, "Certificate authority," Mar. 18, 2012, <http://en.wikipedia.org/w/index.php?title=Certificate_authority&oldid=482543942>.
Wikipedia, "HP ePrint," Oct. 16, 2011, found at <https://web.archive.org/web/20111016081246/http://en.wikipedia.org/wiki/HP_ePrint>.
Wikipedia, "Public-key cryptography," Mar. 28, 2012, <http://en.wikipedia.org/w/index.php?title=Public-key_cryptography&oldid=484410223>.

* cited by examiner

*Primary Examiner* — Jeffrey Pwu
*Assistant Examiner* — Michael D Anderson
(74) *Attorney, Agent, or Firm* — Van Cott, Bagley, Cornwall

(57) ABSTRACT

A method of transmitting a document from a computing device to a printing device using a document server comprising, at the server, receiving user credentials from a user of an authorized computing device, receiving encrypted data defining the document from the authorized computing device, receiving information indicating the intended recipients of the data, receiving user credentials from an authorized printing device, and delivering the encrypted data to an authorized recipient.

20 Claims, 6 Drawing Sheets

TRANSMITTING A DOCUMENT

BACKGROUND

A person or business may have a number of methods of transmitting a document to another person or business located offsite from the sender. A courier system provides delivery confirmation that the document was received as well as assuring that the quality of the document stays the same as when the sender sent it. However, this method may take days to complete delivery and in the process may result in the use of large amounts of fuel thereby damaging the environment.

Fax machines, a LAN fax, or internet fax systems may provide instant delivery, but the quality may be lacking. Additionally, the sender would be sending the document to a machine rather than a person which may result in a lack of security. Specifically, an unintended recipient may see the document and take it or the information thereon before the intended recipient does so.

Emailing the document results in good quality, instant delivery, but is still not legally recognized. Specifically, it may be difficult to have a signed document that has been emailed to a recipient to be recognized officially as a properly signed document. Additionally, with email, in order to convert the email into printed output the recipient would be prompted to take additional steps to do so.

Cloud based systems also may transmit documents that are not legally recognized and further fail to address properly similar security concerns as those experienced with fax machines. Additionally, the features available under a cloud based system may not be universally available to all users and may rely on a secure pull-print system being deployed at the recipient's site.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
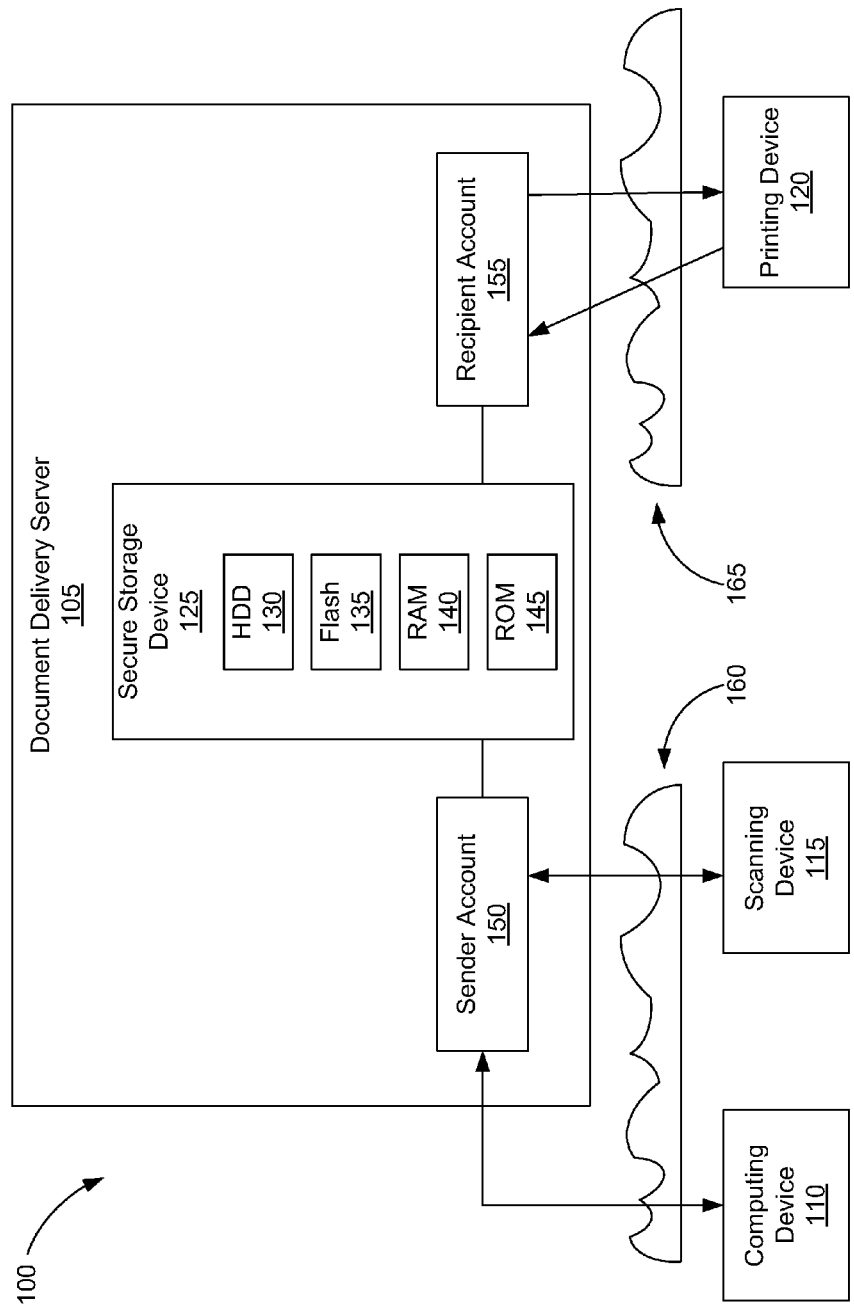
FIG. 1 is a block diagram of a document delivery system according to one example of principles described herein.

As discussed above, currently available methods of transmitting a document from one person to another have their disadvantages. One such disadvantage is the security of the document. Often, the parties involved (sender and recipient) may be dealing with confidential information meant for no one else them to view and use. Such information may include social security numbers, bank account numbers, and other sensitive information that, when acquired by an unintended recipient, may be used nefariously. Fax machines, LAN faxes, and internet fax systems, all fail to provide adequate security of the information. This is because, as mentioned above, the sender is sending the information to a remote device such as a fax machine and not to a person. The device may or may not be in a secure location and may or may not be currently manned by the recipient. As a result of this lack of security, money may be lost or identities stolen simply by allowing a third party to even view the document after it has been printed out. A document that has been remotely printed out on a printer would be subjected to any number of persons viewing the information and could lead to the unintended consequences mentioned above. Restriction of unauthorized users to the physical location of these devices may not provide adequate security as documents left on the device may eventually be disposed of improperly. This too may allow others to view the information resulting in similar outcomes.

Additionally, the quality of the received document may be a concern for some. The quality (or lack thereof) of the document may determine whether the document is legally recognized or independently verifiable. Current fax systems may produce sub-standard documents and as such may necessitate the use of a ground courier system in order to obtain the original document.

Still further, convenience and promptness in receiving the document may concern others who have a busy schedule and want the information quickly. A ground courier system, even when used in conjunction with a remote printing service may still take relatively longer than is necessary to successfully send the document on time. Additionally, the additional costs involved with physically moving the document from one location to another may limit the use of that system. These additional costs add to the price of the service. Additionally, the physical transport of the document from one location to another may also add to the damage done on the environment. Even further, as mentioned above, the security of the document is not totally confirmed in a courier system scenario and the information may be accidentally or even intentionally released to a third party.

Even further, pull-printing systems may be used to control the security of the document as well as reduce the amount of paper used and wasted when the recipient does not remove the document from the printing device. However, these systems are limited to in-house systems and are not available to users outside of the company. This is because access to the enterprises in-house computing system may present additional security risks to either the enterprise itself or the information contained on the storage devices within the network. Additionally, it may be difficult to scan a document into the system for delivery to another person.

The present application, however, provides a computer network-based document delivery system that can be relied on by both senders and receivers and that meets both the security and convenience requirements of business document delivery. The system may comprise a document delivery server that may be used as a document delivery service provider. The document delivery server may include computer usable program code, which when executed by a processor, receives an electronic document form a computing device. The computer usable program code may further cause the server to store those electronic documents. Additionally, the computer usable program code may authenticate a number of users and hardware devices associated with and connected to the server, and send electronic documents to an authorized and authenticated hardware printing device.

Additionally a number of security-related components may be included in the system to provide encryption, non-repudiation, and authentication of devices, servers and users involved with and connected to the system. Still further, the system may comprise a number of authorized network-connected hardcopy devices such as digital document printers, document scanners, and all-in-one, multi-function copier devices to receive information regarding the electronic document to be printed. Even further, the system may include computer usable program code which, when executed by a processor, causes a computing device to create and transmit electronic documents to the document delivery server. With each of the above components, the system may provide high-quality transmission of electronic business documents.

In the present application and in the appended claims the term "cloud computing system" is meant to be understood broadly as any number of physical computing systems operating on a network to provide processing resources to a client system connected to the network. In one example, the implementation of the hardware performing the processing of the applications is abstracted to the user and therefore the user may not know exactly from which server and which memory device associated with that server, his or her services are originating from.

Additionally, in the present application and in the appended claims the term "computing device" is meant to be understood broadly as any device having a processor and computer usable program code executable on the processor. Therefore, a smart phone, a desktop computer, a laptop computer, a tablet device, a scanner, and a printer may all be examples of a computing device.

Further, as used in the present specification and in the appended claims the term "hardcopy device" is meant to be understood as any device capable of producing a hard copy of a document. A toner based printer, liquid inkjet printer, solid ink printer, dye-sublimation printer, thermal printer, UV printer, and pen-based plotters are some examples of a hardcopy device as used in the present application.

Referring now to FIG. 1, a block diagram of a document delivery system (100) is shown according to one example of principles described herein. As briefly mentioned above, the system (100) may include a number of hardware devices which may be used to deliver documents in a way that can be relied on by both senders and receivers and that meets both the security and convenience goals of a business document delivery system. The system may comprise a document delivery server (105), a computing device (110), a scanning device (115), and a printing device (120). Each of these will now be described in more detail.

The document delivery server (105) may be a server apart from the computing device (110), the scanning device (115), and the printing device (120) but which is communicatively coupled to each of these devices. Specifically, the document delivery server (105) may be connected to these devices (110, 115, 120) via a network such as the Internet, an internet, and an intranet. The document delivery server (105) may form a central location where users, via a computing device (110), may upload a number of documents to and have the documents securely stored for a length of time.

The document delivery server (105) may further comprise a secure storage device (125) used by the document delivery server (105) to store the uploaded documents. The secure storage device (125) may use a number of different volatile and non-volatile storage devices to accomplish this. Some examples of a storage device that may be used in the secure storage device (125) may include a hard disk drive (HDD) (130), a flash memory drive (135), random access memory (RAM) (140), and read only memory (ROM) (145), among others. The secure storage device (125) may be both physically secure as well as communicatively secure. For example, the secure storage device (125) may physically exist within a locked room owned and operated by the operator of the system (100). Only authorized persons may be allowed to physically access the secure storage device (125). Additionally, as will be discussed later, the secure storage device (125) may use a number of methods of securing data stored on the device (125) such as data encryption.

In addition to storing documents uploaded to the document delivery server (105), the secure storage device (125) may use these memory devices (130, 135, 140, 145) to further store information regarding specific sender accounts (150) and recipient accounts (155). As will be discussed later, the sender accounts (150) and recipient accounts (155) may be used to allow a number of users to gain access to the secure document delivery server (105), upload documents to the document delivery server (105), and download documents from the document delivery server (105).

In one example, the information stored on the secure storage device (125) may be encrypted in order to prevent unauthorized viewing or use of the document. The encryption of the data stored on the secure storage device (125) may be completed before or after the user has uploaded the document to the document delivery server (105). In one example, the document is encrypted by a computing device (110) before it is sent to the document delivery server (105). In one example, protocols such as Secure Sockets Layer (SSL) or Transport Layer Security (TLS) may be used by the computing devices (110), scanning devices (115), printing devices (120), and the document delivery server (105) such that users using the system (100) may securely send encrypted data to the document delivery server (105) and know that it is the document delivery server (105) that they are sending the data to.

In one example, the system (100) may be implemented as a cloud computing system. In this example, the document delivery server (105) and secure storage device (125) may be part of a network of computing systems that are connected to each other through a network such as the Internet, an internet, or an intranet. Additionally, the document delivery server (105) and secure storage device (125) may be in electrical communication with a number of hardware devices to accomplish the functionality of receiving, storing and sending documents from and to a number of users. Therefore, shared resources, computer usable program code, and information are provided to the document delivery server (105) as well as other devices as a service provided over the network. In this example, the users associated with the system (100) may operate with a number of different hardware devices over a network connection but may be unaware specifically what hardware or computer usable program code is being used to allow them to send and receive documents over the network.

The computing device (110) may comprise at least a processor which, when executing computer usable program code, allows a user to send an encrypted document to the document delivery server (105). Some examples of a computing device (110) may include a smartphone, a desktop computer, a laptop computer, a tablet device, or any other similar computing device. The computer usable program code may, when executed by the processor, allow the user to perform a number of tasks such as document processing and generating emails. The computer usable program code, when executed by the processor of the computing device (110), may further encrypt a document which is to be sent to the document delivery server (105). Similarly, the scanning device (115) may comprise at least a processor which, when executing computer usable program code, allows a user to scan a document, encrypt the document, and send the encrypted document to the document delivery server (105).

This encryption by the computing device (110) and scanning device (115) allows a user to securely send a document to an intended recipient. Specifically, documents intended for a specific user can be encrypted using the sending user's public key. The intended recipient can then decrypt the document using his or her private key. In another example, the sending user can also sign the document using his or her private key and then the receiving user can verify using the sender's public key. A number of other methods may be used to securely transfer the sent document from the computing device (110), to the document delivery server (105), and eventually to the recipient's printing device (120). The printing device (120) may then decrypt the data defining the document by using the appropriate scheme provided by the document delivery server (105).

Additionally, the document delivery server (105), computing device (110), and printing device (120) may provide non-repudiation and authentication for use in the system. In one example, the computing device (110) and document delivery server (105) may each provide proof of the integrity and origin of the document. Additionally, the user may provide authentication information in the form of a username and password to the document delivery server (105) in order to gain access to the services provided on the document delivery server (105). The authentication information may allow the user of the computing device (110) to access his or her account (150). Similarly, the user of the printing device (120) may gain access, through the printing device (120), to their respective recipient account (155) using of a username and password.

Still further, the printing device (120) as well as the applications deployed on the computing device (110) and scanning device (115) may be pre-registered with the document delivery server (105). Specifically, a network account may be set up associating the devices or applications with the users of the devices and the users' accounts (150, 155). In one example, both the document delivery server (105) and the computing device (110), printing device (120), and scanning device (115) may be authenticated via a digital certificate issued by a certificate authority such as Verisign®. In this case, the digital certificates may contain a public key as well as the identity of the owner. A private key may then be used by the end user to confirm authenticity of the device, document, or application involved.

Figure 2:
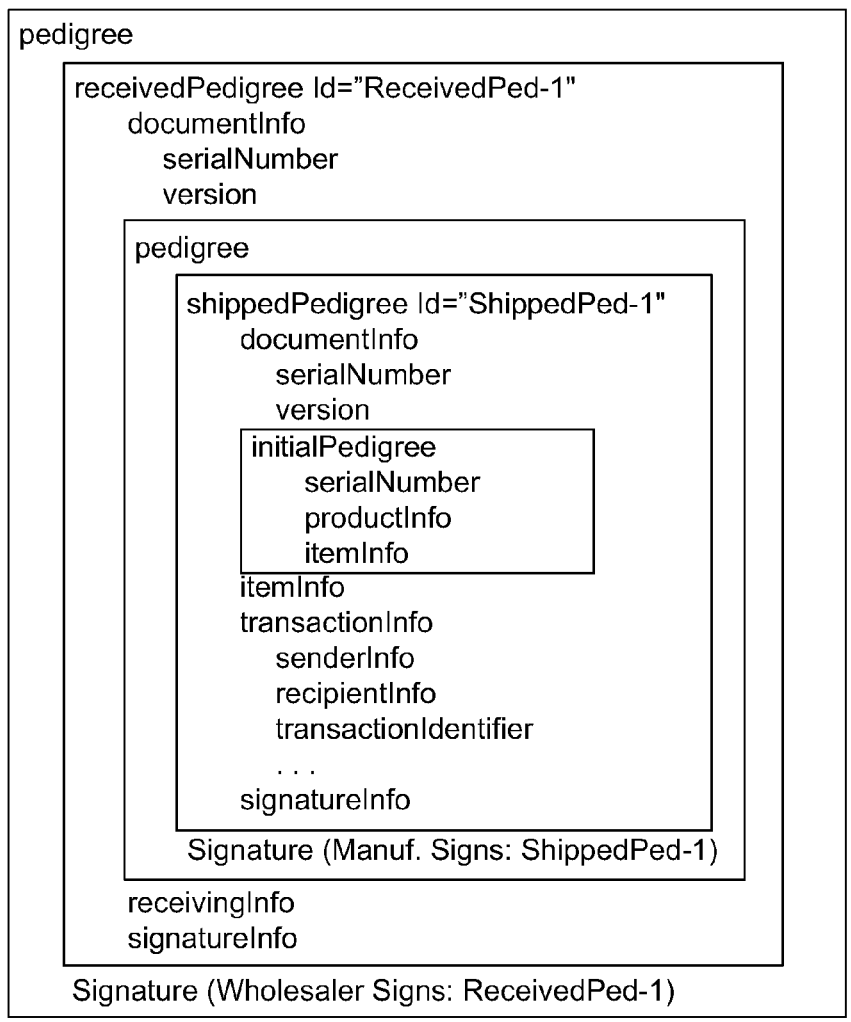
FIG. 2 is a diagram showing an outline of a provenance-based electronic authentication electronic pedigree (ePedigree) according to one example of principles described herein.

In one example, the authentication process may be completed via the document itself. For example, a provenance-based electronic authentication process may be employed to authenticate the document as it moves from one device to another. In this example the document is the "seed" content and is sequentially signed by each sender of the document until it is received by the printing device (120). FIG. 2 shows an outline (200) of the provenance-based electronic authentication electronic pedigree (ePedigree) where the initialPedigree is product supply chain-specific (i.e. serialNumber, productInfo, itemInfo). In one example, in the provenance-based electronic authentication process, the initialPedigree is the document (or a hash thereof) sent by the sending client. During this process, each sender and receiver pair who has received or sent the document may sign the document via, for example, a digital certificate from a certificate authority.

In yet another example, a Giclee or limited run authentication process may be employed. In this example, the digital signature may be augmented by a "materials" signature such as provided by the Dyson relay CMOS Image Device (see http://www.hpl.hp.com/techreports/2010/HPL-2010-42.pdf). The character or region used for authorization may be created using the following schema:

```
<Location>
    <xmin>
    <xmax>
    <ymin>
    <ymax>
<Size>
    <xspan>
    <yspan>
<Semantic Description>
<Forensic Information>
```

This schema, along with the information contained, can then be encrypted and associated with the document's electronic workflow. Access rights are then used to allow the appropriate people to obtain the forensic signature when they compare it to the actual signature obtained by re-scanning the "authentic" document.

The authentication process may also include differential access rights security. In this example, the document sent by the sending user has at least two types of access privileges. These types of access privileges define two different types of participants who may view certain content based on two or more different sets of content. The document is thus a composite document and based on how it is composed for each participant, will represent a different set of content for each. Under this "single sender, multiple recipient" document delivery service, there will be branching in the workflow shown in FIG. 2. For each final document rendering, there will be a separate and unique signing of the final content of the document. Each version will be individually encrypted and decrypted as well as individually signed.

In one example, in order to provide additional security, when the printing device (120) prints off a physical copy of the document, the printer may include on the hardcopy an authentication identifier. The authentication identifier may be any mark that may be identified by the recipient as confirmation that the document is a true copy provided by the original sender. The mark may be associated specifically with the sender and may provide an additional assurance to the recipient of the document that the document being viewed is a true copy and has not been changed or swapped during the delivery process.

In another example, the scanning device (115) may detect a system (100) specific authentication identifier affixed to a hardcopy by a previous printing device (110). In this example, the scanned document may contain an identifier which is associated with or describes additional information about the document being scanned. In one example, the scanning of the identifier may alert the system (100) to the fact that that document had previously been sent by a user and that other users of the system (100) also previously received a hardcopy. This information may be used by the system (100) to allow the user to automatically send a return document back to the original senders as well as some or all of the earlier recipients. In one example, the document being scanned could be a signed version of the document and the user sending that document may wish for a number of recipients to receive the signed version. In this example, multiple persons involved in, for example, a business deal may be able to know the status of the business being conducted and act accordingly.

In another example, the authentication identifier on the hardcopy may indicate that only specific users or recipient are to receive a scanned version of that document. Therefore, only those persons who are involved with the information contained on the document may view, edit, and send that document. In this manner, privacy and security may be maintained throughout the document exchange process as alterations of the document are being made.

Turning again to FIG. 1, the system (100) may further include a first firewall (160) between the computing and scanning device (110 and 115) and the document delivery server (105). The first firewall (160) may permit or deny network transmissions based upon a set of rules and may be used to protect the document delivery server (105) from unauthorized access while permitting legitimate and authorized users' communications to pass through. A second firewall (165) may similarly be situated between the printing device (120) and the document delivery server (105).

In operation, a user of either the computing device (110) or scanning device (115) may send a document to another user by sending his or her credentials (username and password) to the document delivery server (105). In doing so, the user has established a connection between the authorized computing device (110) and the document delivery server (105). The user may then encrypt the document for secure sending, identify a number of intended recipients of the document, and send the document to the document delivery server (105). The sending user may then receive a confirmation notice from the document delivery server (105) that the document has been received and it is stored in the secure storage device (125), ready for the recipient to retrieve it. Similarly, the intended recipient or recipients may receive a notification that the document is available to them on the document delivery server (105).

After the intended recipient has retrieved the document, another notification may be sent to the sending client notifying him or her that the document has reached its destination. The notification may further indicate that a hardcopy of the document had been printed off by the recipient at the authorized and authenticated printing device (120).

Figure 3:
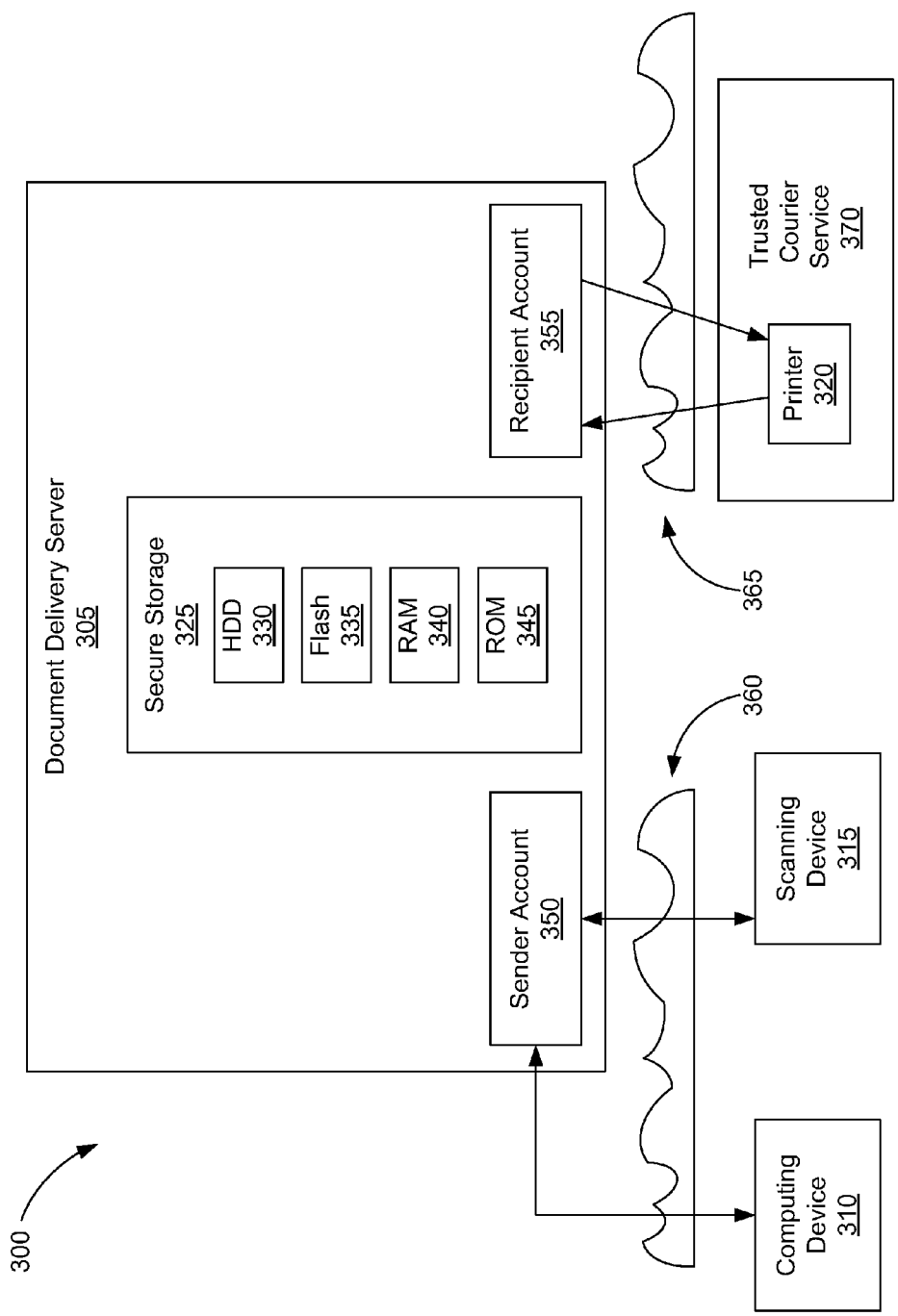
FIG. 3 a block diagram of a document delivery system according to another example of principles described herein.

Turning now to FIG. 3, a block diagram of a document delivery system (300) is shown according to another example of principles described herein. The system (300) may also comprise a document delivery server (305), a computing device (310), a scanning device (315), and a printing device (320). In operation, the system (300) may allow an authorized user, via either the computing device (310) or the scanning device (315) to upload to the document delivery server (305) an encrypted document for later printing by an authorized user using a registered and authorized printing device (320). Both the sender and recipient may have associated with them a sender (350) and recipient (355) account respectively. This allows the document delivery server (305) to securely receive and send the encrypted documents from and to the appropriate users.

The system (300) may also allow a non-authorized user to receive a document. Specifically, while the user of either the computing device (310) or scanning device (315) is sending the document to the document delivery server (305), the user may indicate that the document is to be delivered to a trusted courier service (370) instead of directly to a specific recipient account (355). The document delivery server (305) may then send the document to a printer (320) associated with the trusted courier service (370). The trusted courier service (370) may then schedule a time for a courier to physically deliver the printed document to the intended recipient indicated by the information provided by the sending user. Using this system (300) a user may send a document to another person who may not have created an account with the document delivery server (305) but to which the sending user may still want to send the document to. This allows any sending user to send a document to any person regardless of their status with the document delivery server (305) and system (300).

In the example shown in FIG. 3, the trusted courier service (370) may be pre-registered such that they are placed under contract with the owner and operator of the system (300) to print off and physically deliver the documents as requested by the sending user. The sending user may then be allowed to have a document sent to a printer that, for example, is closest to the recipients address. The trusted courier service (370) will then deliver that document to the recipient within a shortened period of time compared to a delivery system that is completely accomplished via ground delivery.

In the examples shown in FIGS. 1-3, the document delivery server (305) may help to manage those devices communicatively coupled to it. Therefore, the document delivery server (105, 305) along with the computer usable program code contained thereon may insure that the computing device (110, 310), scanning device (115, 315), and a printing device (120, 320) have up-to-date program code installed thereon as well as sufficient ink and paper. If not, a notification email may be sent to the sending user, recipient user, or both indicating that these devices may need attention or servicing. The document delivery server (305) may also provide updated programming code to these devices as needed. Additionally, the document delivery server (305) may monitor the sender (150, 350) and recipient (155, 355) accounts for any unauthorized access or activity and notify the users of a possible breach of security. The users may then take appropriate action to safeguard their account information as well as the security of their pending documents.

Additionally, document delivery servers (105, 305) described above may allow a user to automatically delete the saved documents as they are received. Therefore, once the recipient user has received the document, a notice may be sent to the sending user notifying him or her that the document was received as well as notifying him or her that the document will be deleted. The document delivery server (105, 305) may further allow either the sending or receiving user to save the document to the secure storage (125, 325) for a time if so desired. Still further, the document delivery server (105, 305) may set a threshold time limit, that when crossed, causes those documents stored on the secure storage (125, 325) to be deleted.

Figure 4:
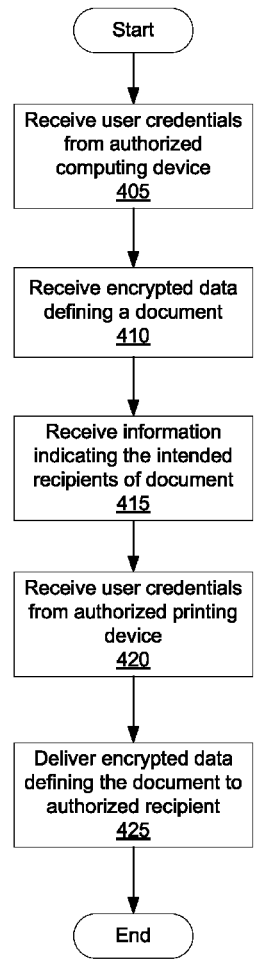
FIG. 4 is a flowchart showing a method of transmitting a document from a computing device to a printing device according to one example of principles described herein.

FIG. 4 is a flowchart showing a method of transmitting a document from a computing device (110, 310) to a printing device (120, 320) according to one example of principles described herein. The method may start with the document delivery server (105, 305) receiving (block 405) user credentials from an authorized computing device (110, 310). These credentials, as discussed above, may allow the sending user to verify to the document delivery server (105, 305) his or her identity. The document delivery server (105, 305) may also use other certificate authority mechanisms to assure that the computing device (110, 310) communicatively coupled thereto is an authorized device.

The document delivery server (105, 305) may further receive (block 410) encrypted data defining a document. As discussed above, the computing device (110, 310) may be preregistered with the document delivery server (105, 305) such that it may communicate with the document delivery server (105, 305) after providing and using a digital certificate. Additionally, the document delivery server (105, 305)

may receive (block 405) the document in an encrypted form adding security to the transaction.

The document delivery server (105, 305) may further receive (block 415) information indicating the intended recipient or recipients of the document. This information may be sent by the user along with the document in the form of an email. In another example, the document delivery server (105, 305) may provide a user interface over the network connection in which the sending user may upload the document and enter in the appropriate information into designated fields provided in the user interface.

The document delivery server (105, 305) may further receive (block 420) user credentials from an authorized hardcopy device such as the printing device (120, 320) described above. These credentials, as discussed above, may be in the form of a digital certificate. The document delivery server (105, 305) may also use other certificate authority mechanisms to assure that the printing devices (120, 320) communicatively coupled thereto are authorized devices.

The document delivery server (105, 305) may further deliver (block 425) the encrypted data defining the document to the authorized recipients. As discussed above, the recipients may receive a notification that the document has been stored on the secure storage device (125, 325) and is waiting for them to log onto the system (100, 300) and print the document on an authorized printing device (120, 320). The recipient may then log onto the system (100, 300) with their login credentials and access their recipient account (155, 355). The a user interface may then indicate those documents stored in connection with the recipient account (155, 355) and allow the user to print those documents off at the authorized printing device (120, 320).

In one example, the recipient may access his or her recipient account (155, 355) via a computing device such as a smartphone, a desktop computer, a laptop computer, a tablet device, or any other similar computing device. In this example, the user may then cause the document to be sent to an authorized printing device (120, 320) associated and pre-registered with the system (100, 300). In another example, the recipient may access his or her recipient account (155, 355) via a user interface included on the printing device (120, 320). In this example, the printing device (120, 320) may provide a digital certificate associated with the printing device (120, 320) to the system (100, 300) while the recipient provides his or her login credentials.

Figure 5:
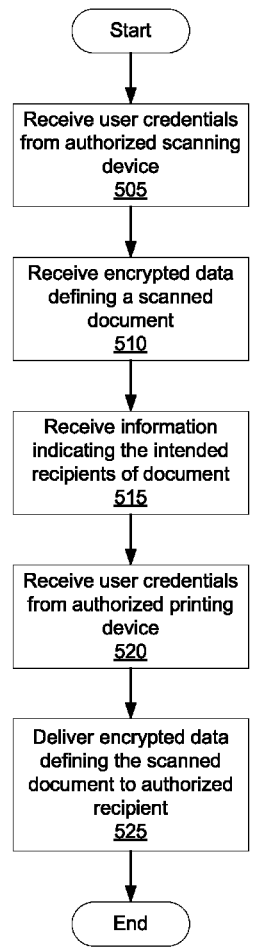
FIG. 5 is a flowchart showing another method of transmitting a document from a scanning device to a printing device according to one example of principles described herein.

FIG. 5 is a flowchart showing another method of transmitting a document from a scanning device (115, 315) to a printing device (120, 320) according to one example of principles described herein. The method may start with the document delivery server (105, 305) receiving (block 505) user credentials from an authorized scanning device (115, 315). These credentials, as discussed above, may be in the form of a digital certificate. The document delivery server (105, 305) may also use other certificate authority mechanisms to assure that scanning device (115, 315) communicatively coupled thereto is an authorized device. In one example, the scanning device (115, 315) may include a user interface through which the sending user may provide to the system (100, 300) his or her credentials.

The document delivery server (105, 305) may further receive (block 510) encrypted data defining a document. As discussed above, the document may be received by the document delivery server (105, 305) through a scanning device (115, 315). The scanning device (115, 315) may be pre-registered with the document delivery server (105, 305) such that it may communicate with the document delivery server (105, 305) after providing and using a digital certificate. Additionally, the document delivery server (105, 305) may receive (block 405) the document in an encrypted form adding security to the transaction. In one example, the scanning device (115, 315) may further comprise a processor that, after the hardcopy has been scanned, will encrypt the resulting image for transfer to the document delivery server (105, 305).

The document delivery server (105, 305) may further receive (block 515) information indicating the intended recipient or recipients of the document. This information may be sent by the user along with the document in the form of an email. In another example, the document delivery server (105, 305) may provide a user interface over the network connection in which the sending user may upload the scanned document and enter in the appropriate information into designated fields provided in the user interface.

The document delivery server (105, 305) may further receive (block 520) user credentials from an authorized hardcopy device such as the printing device (120, 320) described above. These credentials, as discussed above, may be in the form of a digital certificate. The document delivery server (105, 305) may also use other certificate authority mechanisms to assure that the printing devices (120, 320) communicatively coupled thereto are authorized devices.

The document delivery server (105, 305) may further deliver (block 425) the encrypted data defining the document to the authorized recipients. As discussed above, the recipients may receive a notification that the document has been stored on the secure storage device (125, 325) and is waiting for them to log onto the system (100, 300) and print the document on an authorized printing device (120, 320). The recipient may then log onto the system (100, 300) with their login credentials and access their recipient account (155, 355). The a user interface may then indicate those documents stored in connection with the recipient account (155, 355) and allow the user to print those documents off at the authorized printing device (120, 320).

In one example, the recipient may access his or her recipient account (155, 355) via a computing device such as a smart phone, a desktop computer, a laptop computer, a tablet device, or any other similar computing device. In this example, the recipient may then cause the document to be sent to an authorized printing device (120, 320) associated and preregistered with the system (100, 300). In another example, the recipient may access his or her recipient account (155, 355) via a user interface included on the printing device (120, 320). In this example, the printing device (120, 320) may provide a digital certificate associated with the printing device (120, 320) to the system (100, 300) while the recipient provides his or her login credentials.

Figure 6:
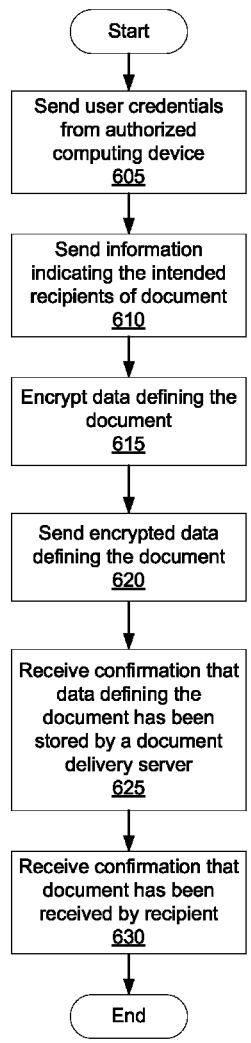
FIG. 6 is a flowchart showing a method of transmitting a document from a computing or scanning device to a document delivery server according to one example of principles described herein.

Turning now to FIG. 6, a flowchart showing a method of transmitting a document from a computing or scanning device to a document delivery server is shown according to one example of principles described herein. The method may begin with the user of a computing device (110, 310) or scanning device (115, 315) sending (block 605) his or her user credentials from the computing device (110, 310). The computing device (110, 310) or scanning device (115, 315) may further send (block 610) information indicating the intended recipient or recipients of the document. The computing device (110, 310) or scanning device (115, 315) may then encrypt (block 615) the data defining the document to be sent and send (block 620) that data to the document delivery server (105, 305). After the data has been sent (block 620), the computing device (110, 310) or scanning device (115, 315) may receive (block 625) confirmation that data defining the document has been stored by the secure storage device (125, 325) on the document delivery server (105, 305). Thereafter, the document may be accessed by the intended recipient and printed on the printing device (120, 320). The computing device (110, 310) or scanning device (115, 315) may then receive (630) confirmation that document has been received by recipient.

In one example, the recipient of the document in FIG. 6 may be a courier service as described above. In this example, the courier service may contract with the owner and operator of the system (100, 300) to physically deliver any documents sent to the authorized printing device (120, 320) to its intended recipient. This way a sending user may still deliver a document to an intended recipient regardless whether the recipient has a recipient account (155, 355) with the system (100, 300).

The present system and method may also be embodied on a computer program product for transferring a document from a sender to a recipient. In one example, the computer program product may comprise a computer readable storage medium having computer usable program code embodied therewith. The computer usable program code may comprise computer usable program code to, when executed by a processor of the document delivery server (105, 305), receive user credentials from an authorized computing device (110, 310). The computing device (110, 310) may provide the document delivery server (105, 305) with a digital certificate indicating that the computing device can be trusted. As such the computer usable code may further include computer usable code to, when executed by the processor, receive and verify the authenticity of the digital certificate.

The computer usable program code may further include computer usable program code to, when executed by the processor, receive encrypted data defining a document the sending user wishes to send to a specific user. In one example, the data may be encrypted by the computing device (110, 310) prior to delivery to the document delivery server (105, 305). In another example, the computer usable program code may further include computer usable program code to, when executed by a processor, encrypt any documents sent by the computing device (110, 310) or a scanning device (115, 315).

Still further, the computer usable program code may comprise computer usable program code to, when executed by the processor, receive information indicating the intended recipient or recipients of the data defining the document sent to the document delivery server (105, 305). This information may be sent by the user along with the data in the form of an email. The computer usable program code, when executed by the processor, may further cause a notification to be sent to the sending user indicating that the document was received and that it is being stored on the secure storage device (125, 325) until the recipients access it. The computer usable program code also may, when executed by a processor, determine if the recipient or recipients have recipient accounts (155, 355) associated with the document delivery server (105, 305). If yes, then the computer usable program code, when executed by the processor, may cause a notification to be sent to the intended recipients indicating that the document is ready for the recipients to print off. If not, the computer usable program code, when executed by a processor, may send an additional notice to the sending user informing them that the intended recipient does not have a recipient account (155, 355) associated with the document delivery server (105, 305). In this case, the computer usable program code, when executed by a processor, may prompt the user to include additional information about the intended recipient such as his or her physical location. Once that additional information is received, the computer usable program code, when executed by the processor, may send additional information back to the sending user indicating specific printing devices (120, 320) at or near the intended recipient to which the sending user may deliver the document. Delivery of the document to one of these locations allows the document to be printed off and physically carried to the intended recipients address by a courier service.

The computer usable program code may further comprise, computer usable program code to, when executed by a processor, receive user credentials from an authorized hardcopy device such as the printing device (120, 320) described above. The computer usable program code may, when executed by the processor, further cause the document delivery server (105, 305) to grant access to the user's recipient account (155, 355).

As discussed above, the printing device (120, 320) may provide the document delivery server (105, 305) with a digital certificate indicating that printing device (120, 320) can be trusted. As such the computer usable program code may further include computer usable code to, when executed by the processor, receive and verify the authenticity of the digital certificate.

Even further, the computer usable program code may include computer usable program code to, when executed by the processor, cause the document delivery server (105, 305) to send the data defining the document to the authorized printing device (120, 320) for printing. Once the data has been sent, the computer usable program code may, when executed by the processor, cause a notification to be sent to the sending user notifying him or her of the receipt of the document by the recipient. The computer usable program code may, when executed by the processor, cause additional notifications as described above such as a notification that the intended recipient is not a registered user of the system (100, 300) or that the document has been stored on the secure data device (125, 325) after upload.

The specification and figures describe a system and method for securely transmitting a document over a document server. The method and system provides for the secure encryption and decryption of the document being delivered over the network. This system and method for securely transmitting a document over a document server may have a number of advantages, including: instant document delivery over the network, secure transmission of the document using non-repudiation, privacy and access control as well as providing a system that provides the delivery of documents that may be legally recognized and independently verifiable. Still further, the system and method allows a user to send a document to another person regardless of the recipient's status with the system. Specifically, the recipient does not need to be signed up or authenticated with the system for the sender to send a document to him or her. A courier system may be provided that may print off the document for the recipient and physically carry the document to the recipients address. In comparison to a courier system where transfer of the document is done completely by courier, the system and method provides for a way to deliver the document relatively faster. Still further, the system and method provides for a provenance-based electronic authentication process that authenticates the document as it moves from one device to another by having each sender and receiver digitally sign the document by, for example, using a digital certificate scheme.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of transmitting a document from a computing device to a printing device using a document server comprising, at the server:
   receiving user credentials from a user of an authorized computing device;
   receiving encrypted data defining the document from the authorized computing device;
   receiving information indicating at least one intended recipients of the data, each intended recipient being a recipient other than the user of the authorized computing device;
   receiving, from the printing device, at least one credential associated with the printing device;
   determining, based on the at least one credential, that the printing device is an authorized printing device;
   receiving at least one credential associated with the at least one intended recipient from the authorized printing device; and
   delivering the encrypted data to the authorized printing device.

2. The method of claim 1, in which receiving the encrypted data from the authorized computing device further comprises receiving a digital certificate from the computing device indicating that the identity information of the computing device belongs with the public key provided in the digital certificate.

3. The method of claim 1, in which delivering the encrypted data to an authorized recipient further comprises sending a digital certificate indicating that the identity information of the sender of the data belongs with the public key provided in the digital certificate.

4. The method of claim 1, in which the computing device is a scanning device, and in which the scanning device scans a hardcopy of a document, encrypts the data defining the image of the document, and forwards that data to server.

5. The method of claim 1, in which receiving information indicating the intended recipients of the data further comprises:
   determining if the intended recipients are authorized to receive the data;
   in which, if an intended recipient is not authorized to receive the data, notifying the user of the authorized computing device that the intended recipient is not authorized to receive the data.

6. The method of claim 5, in which notifying the user of the authorized computing device that the intended recipient is not authorized to receive the data further comprises prompting the user of the authorized computing device to provide additional location information about the intended recipient; and
   once the location information has been received, providing location information regarding other authorized printing devices near the location identified by the user of an authorized computing device.

7. The method of claim 1, in which the document is received using a provenance-based electronic authentication process in which all pairs of senders and recipients of the data sign the data with a digital certificate from a certificate authority.

8. A system of securely sending a document to a recipient, comprising:
   a document delivery server;
   wherein the document delivery server is to receive, from a printing device, a digital certificate associated with the printing device and determine, based on the digital certificate, that the printing device is an authorized printing device; and
   wherein the document delivery server is further to receive an encrypted form of the document from an authorized computing device communicatively coupled to and authorized with the document delivery server, store the encrypted document, and forward the encrypted document to a authorized printing device communicatively coupled to and authorized with the document delivery server, the recipient being a recipient other than the user of the authorized computing device.

9. The system of claim 8, in which the computing device and printing device communicate with the document delivery server using digital certificates provided by a certificate authority.

10. The system of claim 8, in which the computing device is a scanning device, and in which the scanning device scans a hardcopy of a document, encrypts the data defining the image of the document, and forwards that document to the document delivery server.

11. The system of claim 8, in which the encrypted document is received using a provenance-based electronic authentication process in which all pairs of senders and recipients of the document sign the document with a digital certificate provided by a certificate authority.

12. The system of claim 8, in which the computing device further sends information indicating the intended recipients of the document to the document delivery server;
   in which the document delivery server determines if the intended recipients are authorized to receive the document; and
   in which, if an intended recipient is not authorized to receive the document, the document delivery server notifies the user of the authorized computing device that the intended recipient is not authorized to receive the document and provides geographic location information regarding other authorized printing devices geographically near the of the intended recipient.

13. The system of claim 8, in which the printing device prints out a hardcopy of the document comprising an authentication identifier in which the authentication identifier is associated with a sender of the document; and
   in which subsequent scanning of the document alerts the system to any previous recipients of the document and prevents a user from forwarding the document to unauthorized users.

14. A computer program product for transmitting a document, the computer program product comprising:
   a computer readable storage medium having computer usable program code embodied therewith, the computer usable program code comprising:
     computer usable program code to, when executed by a processor, receive credentials from a user of a computing device;
     computer usable program code to, when executed by a processor, receive an encrypted document from the authorized computing device;
     computer usable program code to, when executed by a processor, receive from the printing device a digital certificate associated with the printing device;
     computer usable program code to, when executed by a processor, determine based on the digital certificate, that the printing device is an authorized printing device using at least one certificate authority mechanism;
     computer usable program code to, when executed by a processor, receive information indicating an intended recipient of the encrypted document, the intended recipient being a recipient other than the user of the authorized computing device;

computer usable program code to, when executed by a processor, receive at least one user credentials associated with the intended recipient from the authorized printing device; and computer usable program code to, when executed by a processor, deliver the encrypted document to the intended recipient via the authorized printing device.

15. The computer program product of claim 14, further comprising computer usable program code to, when executed by a processor, perform a provenance-based electronic authentication process in which all pairs of senders and recipients of the document sign the document with a digital certificate from a certificate authority.

16. The method of claim 1, in which delivery of the encrypted data triggers a notice to the user of the authorized computing device and provides the user with the option to have the document saved on the server or deleted from the server.

17. The method of claim 1, wherein the at least one credential is a digital certificate associated with the printing device.

18. The method of claim 17, wherein the determining comprises determining, based on the digital certificate and using at least one certificate authority mechanism, that the printing device is an authorized printing device.

19. The system of claim 8, wherein the document delivery server is to determine, based on the digital certificate and using at least one certificate authority mechanism, that the printing device is an authorized printing device.

20. The computer program product of claim 14, further comprising computer usable program code to, when executed by a processor, delete any copy of the received encrypted document after the document has been delivered to one of a number of recipients.

* * * * *

UNITED STATES PATENT AND TRADEMARK OFFICE
CERTIFICATE OF CORRECTION

PATENT NO. : 8,966,256 B2  Page 1 of 1
APPLICATION NO. : 13/460334
DATED : February 24, 2015
INVENTOR(S) : Randall Edward Grohs et al.

It is certified that error appears in the above-identified patent and that said Letters Patent is hereby corrected as shown below:

In the claims

In column 13, line 11, in Claim 1, delete "recipients" and insert -- recipient --, therefor.

In column 14, line 6, in Claim 8, delete "a" and insert -- the --, therefor.

In column 14, line 37, in Claim 12, delete "the of the" and insert -- the --, therefor.

In column 15, line 4, in Claim 14, delete "credentials" and insert -- credential --, therefor.

Signed and Sealed this
First Day of December, 2015

Michelle K. Lee
*Director of the United States Patent and Trademark Office*